(No Model.)

J. DUNKIN.
HORSE RAKE.

No. 359,534. Patented Mar. 15, 1887.

WITNESSES:
Thos. Houghton.
Edw. W. Byrn.

INVENTOR:
James Dunkin
BY Munn & Co.
ATTORNEYS.

UNITED STATES PATENT OFFICE.

JAMES DUNKIN, OF BRIDGEPORT, WEST VIRGINIA.

HORSE-RAKE.

SPECIFICATION forming part of Letters Patent No. 359,534, dated March 15, 1887.

Application filed February 23, 1886. Serial No. 192,950. (No model.)

*To all whom it may concern:*

Be it known that I, JAMES DUNKIN, of Bridgeport, in the county of Harrison and State of West Virginia, have invented a new and useful Improvement in Hay Rakes and Carriers, of which the following is a description.

Figure 1:
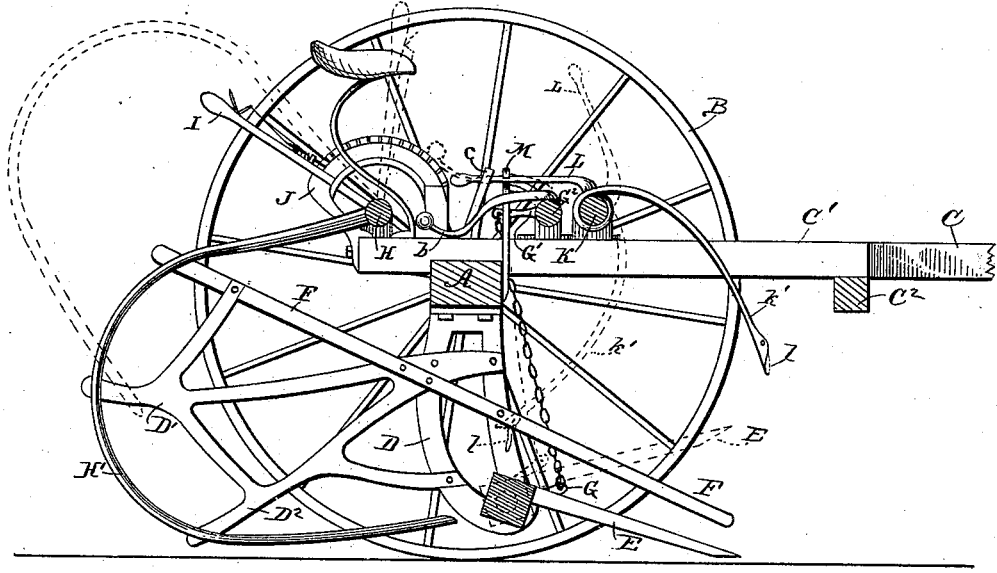
Figure 2:
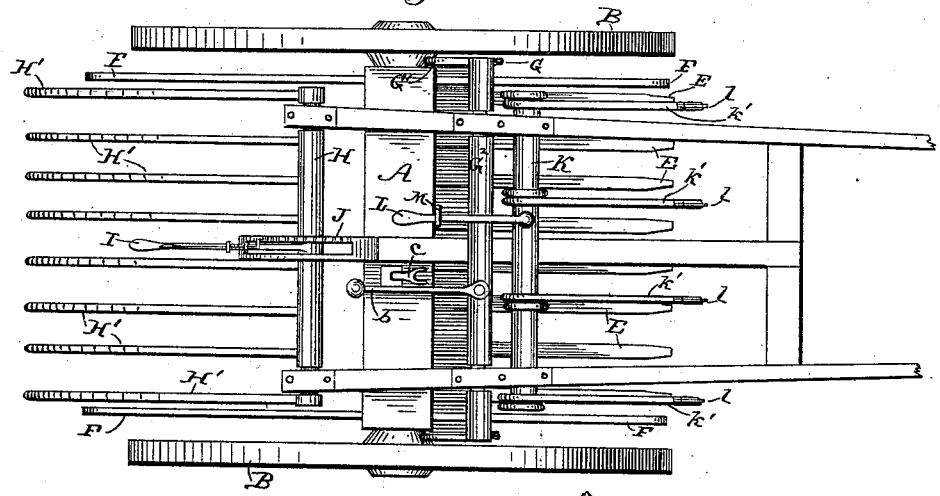
Figures 3, 4:
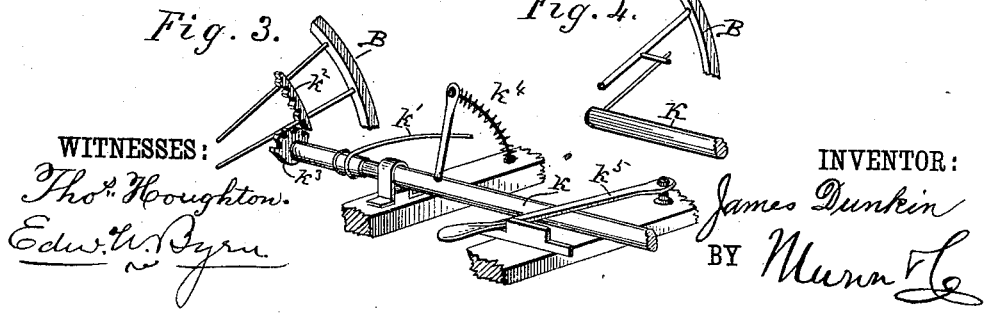

Figure 1 is a vertical section at right angles to the axle. Fig. 2 is a plan view. Figs. 3 and 4 are perspective views of means for operating the loader automatically.

The object of my invention is to provide an improved hay rake and carrier which shall gather up the hay as it lies in the swath, load it into a carrier, in which, when it accumulates in sufficient quantities, it is carried to the place of storage and dumped.

To this end my invention consists in the peculiar construction and arrangement of parts, which I will now proceed to describe.

In the drawings, A represents the axle, and B B the wheels, upon which the other parts are mounted and transported.

C C are the two shafts for the team, and C' a middle bar, which shafts and bar at their rear ends are mounted upon the axle and at their front ends are fastened to a cross-bar, $C^2$.

To the bottom side of the axle, near each wheel, is firmly attached a pendent metal frame, D D' $D^2$, in the lower part of which is journaled the shaft of the rake E, whose teeth point to the front and occupy an inclined position to the ground, adapted to take up the hay lying thereon. To the side of each of the two frames D D' $D^2$ is attached a guard-bar, F, which bars occupy a position at the end of the rake and a little above its normal plane. These guard-bars project in the rear past the axle and serve to keep the hay that gathers on the rake from being thrown under the wheels.

To the ends of the rake-shaft outside the guard-bars are rigidly attached arms G G, which connect by rods or chains *a a* with corresponding arms, G' G', rigidly fixed to a transverse rock-shaft, $G^2$. This rock-shaft is journaled in bearings on top of the shaft-bars, and is provided with a curved lever, *b*, which, when resting upon the top of the axle, allows the rake to rest upon the ground, but which lever, when pushed forward and caught in the fork of a standard, *c*, on the axle, rocks the shafts $G^2$ and also the shaft forming the rake-head, and holds the teeth of the rake in an upwardly-inclined position, as in dotted lines. When the rake-teeth are down in position for gathering hay, the arms G' G' of the rock-shaft rest upon the top of the axle and hold the rake-teeth from descending farther and going into the ground.

H H' is the hay-carrier, which is in the nature of a rocking shaft or head, H, journaled in bearings on the rear ends of the shaft-bars, which rake-head is provided with long curved teeth H', which, in connection with the end frames, D D' $D^2$, form a receptacle of considerable size, into which the hay gathered by the rake is stowed by a loader, hereinafter described. This carrier is provided with an upwardly-extending lever, I, by which the carrier is raised on its axis and its contents dumped. To prevent the carrier from dumping itself before being fully loaded, the lever I is adapted to be locked back with the teeth of the carrier close up to the rake by means of notches in a bracket or frame, J, mounted upon the stationary part of the frame-work.

Now, for taking the hay gathered by the rake and loading it into the carrier, a rock-shaft, K, is journaled transversely to the shaft-bars in front of the rock-shaft which adjusts the rake. This rock-shaft K is provided with curved teeth K', which are wound spirally around the shaft *k*, to render them elastic, and have a range of movement back over the rake toward the carrier. This rock-shaft is provided with a lever, L, by which the loader is worked backward and forward over the rake. When the loader is not in use, it is thrown forward, and the lever L is caught and held beneath a hook, M, on the axle. At the lower end of the teeth of the loader there are formed slots or recesses, into each of which is loosely pivoted a latch, *l*. As the teeth move backward toward the carrier these latches fall out and assume a position at right angles to the teeth and bear against the bulk of hay on the rake, thus giving a bearing for the loader against the hay to push the latter back into the carrier. When the loader is drawn forward, these latches fold on their axes and move over the hay.

In operating the machine as thus described the rake is lowered with its teeth inclined toward the ground, and as the machine is drawn across the field in this position it gathers hay upon the rake. As soon as it is filled its teeth are raised by the rock-shaft and lever above, and the loader is rocked by its lever back and forth, and its teeth, with their latches, force the hay on the rake back into the carrier, which operation is repeated until the carrier is full. When the carrier is filled, the rake is raised and the mass of hay being kept from interfering with the wheels by the side frames, D D' D², the vehicle is driven to the place of storage and the carrier dumped by its lever in the well-known way. Instead of operating the loader by hand through lever L, I may arrange it to work automatically, and for this purpose a short toothed segment, K², Fig. 3, is affixed to one of the wheels on the inside, and a gear-wheel, K³, is fixed on the end of the shaft K, to be operated upon by the toothed segment on the wheel. This gives the rearward motion to the loader, which loader is brought back to its position by one or more springs, K⁴. A lever, K⁵, is also employed to shift the shaft K longitudinally to disconnect the automatic mechanism when the loader is to be operated by hand.

As a further modification, the toothed segment K² may be supplanted by an arm projecting horizontally from the wheel, as in Fig. 4, and the gear-wheel K³ may also be supplanted by an arm adapted to be struck and operated upon by the arm on the wheel for effecting the automatic operation of the loader.

Having thus described my invention, what I claim as new is—

1. The combination, with the wheels and axle, of the pendent side frames, D D' D², suspended therefrom and carrying inclined guard-bars F, extending in front of the wheels and co-operating with the rake, a rock-shaft H, with curved teeth H', forming, with the pendent frames, a receptacle and carrier, and the rake E, journaled in the lower portion of the pendent frame, substantially as and for the purpose described.

2. The combination of the hay-carrier, the rake arranged in front of the carrier, and the longitudinally-adjustable rock-shaft K, with downwardly-projecting and rearwardly-moving teeth k', a spring for rocking said rock-shaft in one direction and a toothed connection between the rock-shaft and one of the supporting-wheels for rocking the rock-shaft in opposition to the spring at one point in the revolution of the wheel for automatically clearing the load from the rake, substantially as described.

JAMES DUNKIN.

Witnesses:
R. D. WILSON,
C. A. W. SHEEHY.